United States Patent [19]

Maybury

[11] 4,212,248

[45] Jul. 15, 1980

[54] APPARATUS AND METHOD FOR REDUCING INTERLINE TWISTING

[75] Inventor: Richard W. Maybury, Gorleston, England

[73] Assignee: Brown & Root, Inc., Houston, Tex.

[21] Appl. No.: 882,794

[22] Filed: Mar. 2, 1978

[51] Int. Cl.³ .............................................. B61B 13/10
[52] U.S. Cl. .............................. 104/138 G; 33/178 F; 134/167 C; 254/134.5
[58] Field of Search ................. 104/138 R, 138 G; 105/365; 15/104.03, 104.05, 104.3 R; 254/134.5; 250/358 P; 134/166 C, 168 C, 167 C, 169 C; 72/466; 73/40, 40.5 R, 40.5 A; 33/1 H, 178 F; 118/105, 254, 306, 317, 408, 622, DIG. 10

[56] References Cited

U.S. PATENT DOCUMENTS

| 2,601,691 | 7/1952 | Dyer | 134/167 C |
|---|---|---|---|
| 2,897,779 | 8/1959 | Perkins | 104/138 G |
| 2,935,777 | 5/1960 | Perkins et al. | 254/134.5 |
| 3,940,855 | 3/1976 | Ver Nooy et al. | 33/178 F |

FOREIGN PATENT DOCUMENTS 2502056  7/1975  Fed. Rep. of Germany ....... 134/167 C

*Primary Examiner*—John J. Love
*Assistant Examiner*—Ross Weaver
*Attorney, Agent, or Firm*—Kenway & Jenney

[57] ABSTRACT

An apparatus and method for reducing interline twisting of any pair of a plurality of lines connected to a device which longitudinally traverses the interior of an elongated tubular member is disclosed. The lines are connected between the device and the tubular member exit opening through which the device may be inserted into the tubular member. The device tends to rotate about its longitudinal axis as it traverses the interior of the tubular member. The apparatus comprises a barrier guide member having a body portion mounted for rotational movement about a rotational axis. The body portion includes means for maintaining a fixed orientation of the body portion relative to the direction of pull of the earth's gravity. At least one line is connected to the body portion, for example a tow line, and at least one other line is preferably connected to the device on a side of the body portion opposite to that at which the tow line is connected. The lines connected to the body portion thus have a fixed spatial orientation; and the lines, if any, connected to the device are physically constrained to prevent any device connected line from encircling any of the connection points between the body portion and its associated lines (and hence from encircling any body portion connected line) whereby a fixed relative orientation between pairs of said plurality of lines is maintained to prevent interline twisting.

12 Claims, 7 Drawing Figures

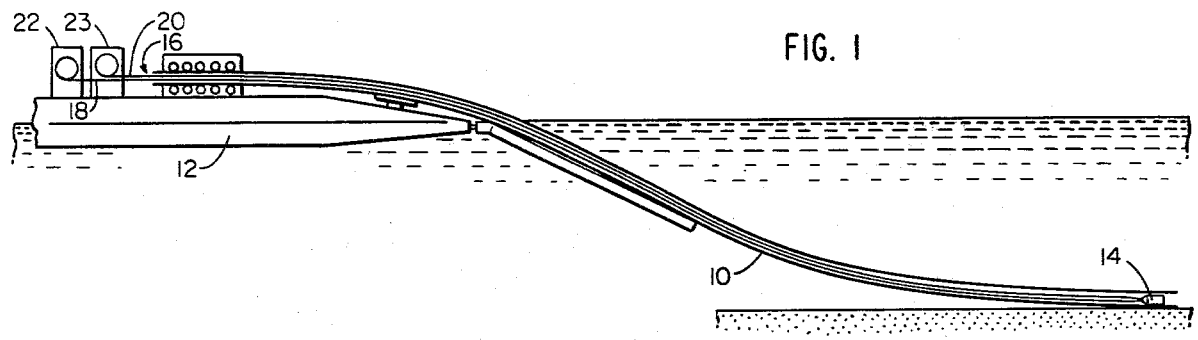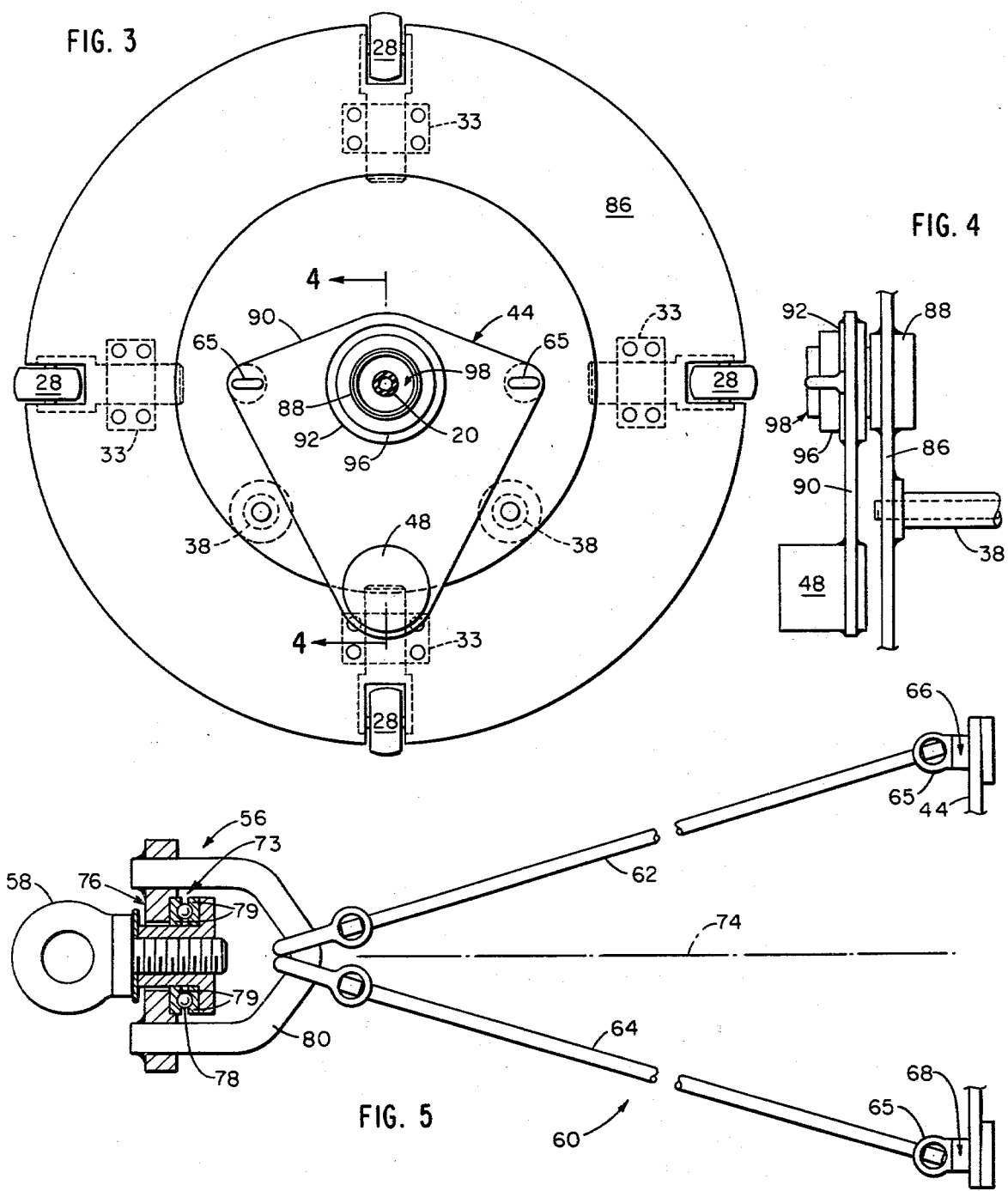

APPARATUS AND METHOD FOR REDUCING INTERLINE TWISTING

The invention relates generally to an apparatus and method for traversing the interior of a tubular member and in particular to a pipeline traversing apparatus and method for inspecting and examining the interior of an underwater pipeline.

BACKGROUND OF THE INVENTION

There are many times both during and after the construction of long tubular members when it is desirable to examine the member, for example, to determine whether there are any structural faults, and if a fault does exist, to determine its location. In most applications, it is not difficult either to visually examine the member from its exterior or to pass an examining device, for example, an X-ray apparatus, along the exterior of the member to determine whether the member is in a satisfactory operating condition.

It is difficult, if not impossible, however, to examine the member from its exterior when the member is either buried beneath the surface of the earth or buried deep beneath the surface of a body of water. A typical application is examination of a pipeline laid along or buried beneath the bottom of a body of water, such as those used to bring offshore petroleum or gas production onshore.

Thus, in the process of laying and maintaining these underground or underwater pipelines, it is often necessary, as a routine maintenance procedure, to examine tubular members by passing a pig member through the pipeline interior, the exterior of the member being substantially inaccessible. In other situations, the pig member traverses the interior of the pipeline to detect a known buckle that has occurred a substantial distance from the pipeline entrance opening. A typical buckle detector for this application is described and claimed in Jones, U.S. Pat. No. 3,739,591, issued June 19, 1973, and assigned to the assignee of this invention. The pig member described in Jones is driven through the pipeline interior by a pneumatically actuated drive system.

During traversal of the pipeline, however, the pig member, such as that described in Jones, U.S. Pat. No. 3,739,591, tends to rotate around its longitudinal axis. Consequently, when two separate lines are connected to the pig described in Jones, U.S. Pat. No. 3,739,591, for example a tow line and a fluid flow line, the lines rotate about one another and tend to twist and entangle because of the rotation of the pig as it travels. The entangled lines may either cause a loss of fluid pressure at the pig member thereby stopping its forward progress, or may prevent the proper detachment of one of the lines which normally occurs after the pig member reaches its termination portion within the tubular member.

It is therefore a principal object of this invention to provide an apparatus and method for reducing and even preventing interline twisting when a pig member traverses the interior of a tubular member. Other objects of the invention include providing a reliable and low cost apparatus and method for preventing interline twisting, providing an apparatus and method which can be used under water as well as underground, and which will operate at high pressures. Yet further objects of the invention are to provide an apparatus and method which maintains substantially twist-free line pairs and has a simple structure.

SUMMARY OF THE INVENTION

In one aspect of the invention, an apparatus for reducing interline twisting of any pair of a plurality of lines connected to a device which traverses the interior of an elongated tubular member is featured. The lines are connected between the device and a tubular member exit opening, and the device tends to rotate about its longitudinal axis as it traverses the interior of the tubular member. The apparatus features a barrier guide member having a barrier body portion, at least one line receiving member, and a first connecting means for connecting each line receiving member to the body portion at at least one connecting point to provide a relatively fixed spatial orientation for the line receiving member. The barrier body portion is mounted on the device for rotational movement about a barrier member rotation axis and the rotation axis is substantially parallel to the device longitudinal axis. The body portion further has means for maintaining the orientation of the body portion substantially fixed with respect to the direction of the gravitational pull of the earth. Each line receiving member is connected to at least one of a first group of the lines.

The apparatus further features second connecting means for connecting each of a second group of lines, if any, to the device. The second connecting means in combination with the barrier guide member prevents each line of the second group from encircling any connection point of the line receiving members to the barrier body portion as the device rotates.

When the number of lines of said second group is greater than one, each line of the second group of lines is connected to the device substantially along the longitudinal axis of the device and the total number of the second group lines is no greater than the number of line receiving members plus one. Thereby, each pair of the second group of lines is prevented from interline twisting by the barrier guide member.

In particular embodiments of the invention, the number of line receiving members is one and the number of second group lines is also one. In this embodiment, the line receiving member is connected to the body portion at two connection points, each point being spaced from the longitudinal axis of the device. Each second group line is constrained to pass through a defined area in a plane containing the two points, the two points lying on a circumference bounding the area. The plane is a plane of maximum intersection angle with the longitudinal axis of the device.

In a preferred embodiment of the invention, the barrier body portion orientation maintaining means features a weighted member connected to the barrier body portion for providing a substantially radially displaced center of gravity for said barrier guide member whereby the weighted member maintains the body portion in a substantially fixed vertical orientation independent of the rotational position of the device about its longitudinal axis.

The method of the invention for reducing interline twisting of any pair of a plurality of lines connected between a tubular member opening and a device for traversing the interior of an elongated tubular member from the tubular member opening, the lines tending to twist during travel of the device through the interior of the tubular member as a result of rotation of the device about its longitudinal axis features the following steps: maintaining the orientation of a barrier guide member relative to the directional pull of the earth's gravity; and connecting at least one of the lines to the barrier guide member, the lines being connected to the barrier guide member thereby having a fixed spatial orientation relative to each other and the guide member. The method further features the step of constraining each line connected to the device to have a fixed spatial orientation relative to each other device connected line, if any, and to each of the barrier member connected lines at the connections of each said barrier connected line to said barrier guide member.

DESCRIPTION OF THE DRAWINGS

Other objects, features, and advantages of the invention will appear from the following description of a preferred embodiment of the invention taken together with the drawings in which:

FIG. 1 is a general view of a typical application of the apparatus according to the invention for detecting underwater buckles;

FIG. 3 is an end view of the buckle detector looking from lines 3—3 of FIG. 2;

FIG. 4 is a cross-sectional view along lines 4—4 of FIG. 3 of the barrier guide member body portion of the apparatus according to the invention;

FIG. 5 is a more detailed view of the towing bridle and tow line connection according to a preferred embodiment of the invention.

DESCRIPTION OF A PREFERRED EMBODIMENT

Figures 2A, 6:
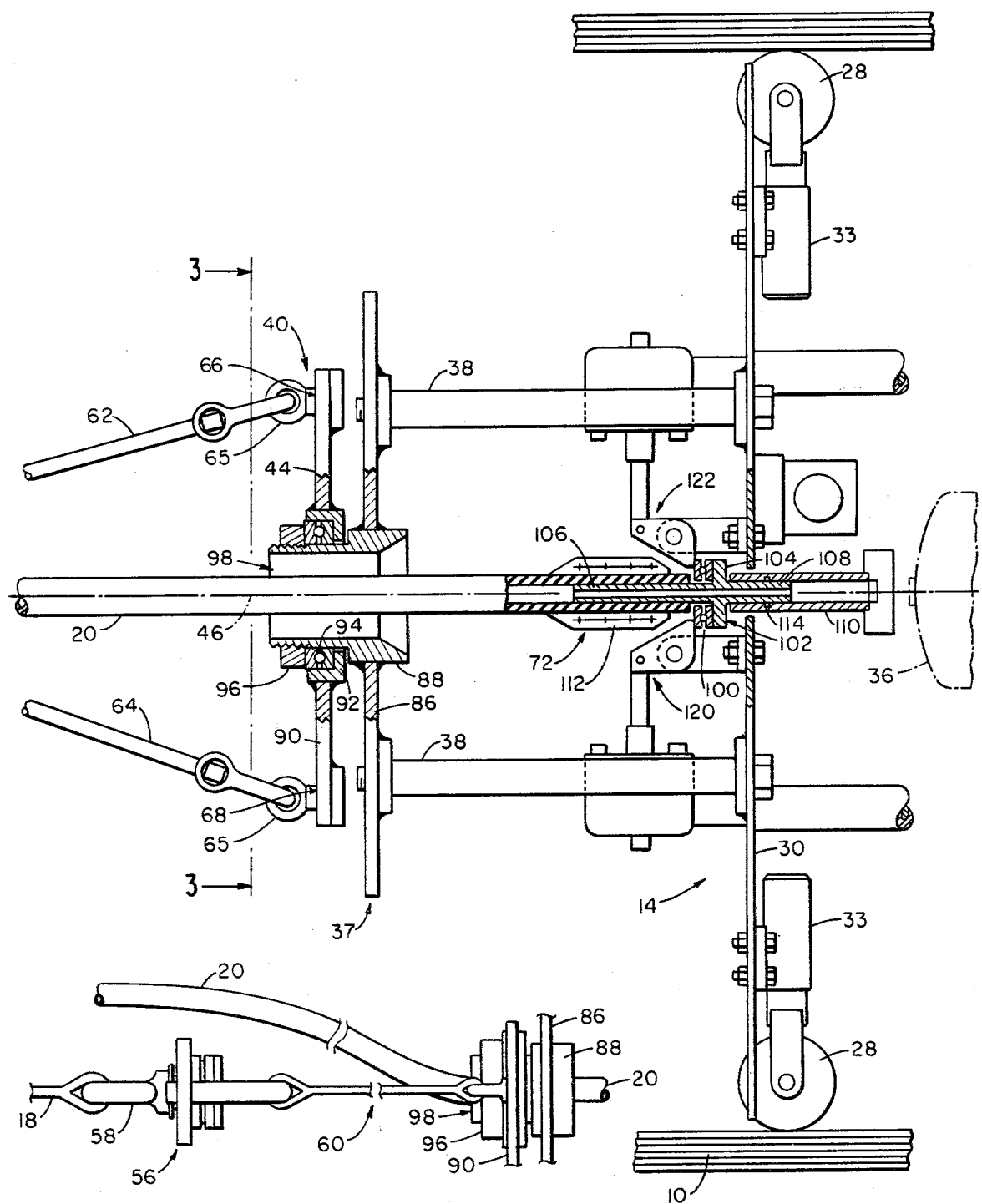
FIG. 6 is a side elevation view, simplified to show the relationship of the tow line and the fluid line according to the illustrated embodiment of the invention.

Referring to FIG. 1, the apparatus and method of the present invention are particularly adaptable to evaluating the integrity of a pipeline during an offshore pipeline laying operation by performing routine as well as necessary inspections of a submerged pipeline 10 which is being laid from a pipelaying barge 12. Typically, a pipeline traversing device or pig member 14 is inserted into the pipeline at a tubular member exit opening 16 and traverses a length of the pipeline or tubular member until it reaches either the other end of the pipeline or a defective portion of the pipeline, such as a buckle in the pipeline. A typical pig member is described in Jones U.S. Pat. No. 3,739,591, noted above, whose disclosure is incorporated herein by reference.

There is typically connected between the pig member 14 and the tubular member exit opening 16, at least a tow line 18 and a fluid conduit or connecting line 20. Briefly, in typical operation, the pig member is propelled through the pipeline by a drive element forming an integral part thereof and powered by fluid under pressure supplied through the connecting line 20 from a compressor (not shown) on board the vessel. After the pig reaches a termination position at which forward movement is blocked or otherwise stopped, the pneumatic pressure in line 20 is reduced or terminated whereby an automatic release mechanism on the pig member disconnects and releases the fluid connecting line from its operative engagement with the pig member and in particular with the drive element.

As the pig member traverses the pipeline, it tends to rotate about its longitudinal axis due to the eccentricities of the pipeline member interior. Since the spatial orientation of the lines, 18, 20, at the exit opening 16 is fixed relative to each other, the pig member rotation tends to cause interline twisting of the connecting and tow lines, that is, the tow line 18 and the fluid conduit 20 wrap around one another. If the lines are not twisted badly, the fluid connecting line, after being released at the termination position, is removed by pulling it from the pipeline member, leaving only the tow line. The pig member can then be slowly withdrawn from the pipeline during a controlled procedure. The tow line and fluid flow line are withdrawn from the pipeline by winch members 22 and 23 respectively.

Figure 2B:
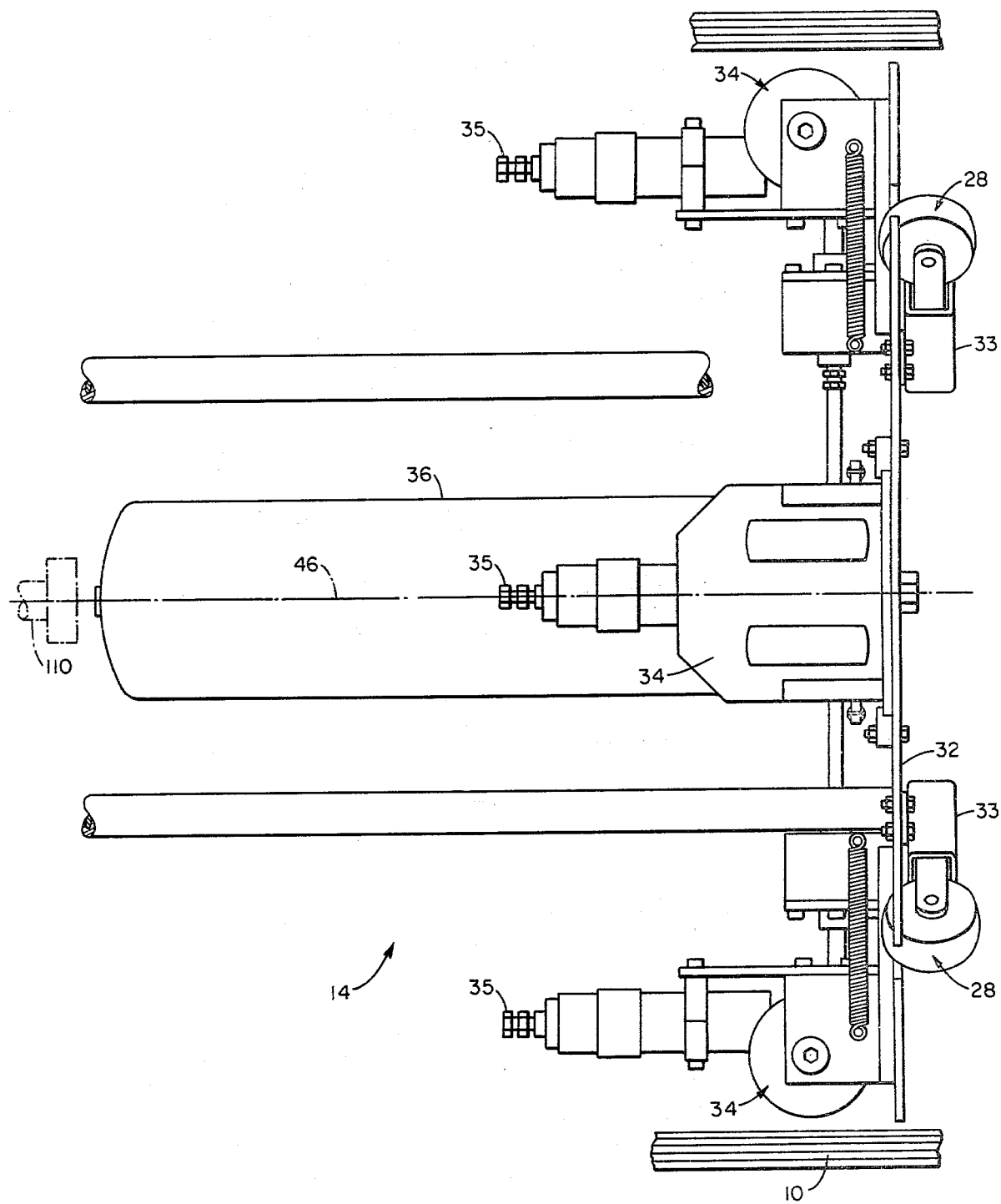
FIG. 2 (in two parts, FIGS. 2A and 2B) is a schematic cross-sectional view of a typical buckle detector according to the invention.

Referring to FIG. 2, which is displayed on two sheets as FIGS. 2A and 2B, a typical pig member 14, described in detail in the Jones, U.S. Pat. No. 3,739,591 patent, incorporated herein by reference, has a plurality of freely rotating wheel members 28 which are supported by supporting planar members 30 and 32 through spring-loaded wheel support assemblies 33. Wheels 28, when the pig is inserted into the pipeline, are urged inward against the spring loading of assemblies 33 and as a result position the pig member in a position substantially equally spaced from the interior wall of the pipeline member. As shown, the wheels and wheel assemblies supported by planar member 30 are rotationally offset by about 45° with respect to the wheels and wheel assemblies supported by planar member 32. This provides greater uniformity of spacing of the pig member from the pipeline interior wall.

In addition to wheels 28, planar member 32 also supports a plurality of pneumatically driven dual wheel drive assemblies 34 which are configured for connection to the fluid flow line through fluid connectors 35 to drive the pig member in the forward direction, that is, to the right in FIG. 2. Pig member 14 also includes a power and control module 36.

Pig member 14 according to the invention, has an apparatus 37 mounted at a rearward section thereof for preventing interline twisting between tow line 18 and connecting line 20. Planar member 30 supports apparatus 37 through hollow connecting rods 38. The apparatus 37 has a barrier guide member 40 which includes a barrier body portion 44 mounted for free rotational movement about a barrier member rotation axis 46. The barrier member rotation axis 46 is parallel to the longitudinal axis of the pig member and, in the illustrated embodiment, coincides with the longitudinal axis of the pig member about which the pig member rotates as it traverses the interior of the tubular pipeline member.

The illustrated barrier body portion 44 supports a weighted member 48 (FIGS. 3 and 4) at a position radially displaced from the rotation axis 46 of the barrier guide member to provide a displaced center of gravity for the barrier guide member and in particular the barrier body portion. In this manner, the relative spatial orientation of the barrier guide member 40, which is dependent upon the spatial orientation of the freely rotating barrier body portion, remains substantially fixed, independent of the rotational position of the pig member about its longitudinal axis.

Referring to FIG. 5, the barrier guide member further includes a line receiving member 56. The tow line 18 connects to the line receiving member 56 through a tow eye 58. Illustrated line receiving member 56 is connected, in turn, to the body portion 44 of the barrier guide member 40 through a towing bridle 60. In other embodiments of the invention, the line receiving member may be connected directly to the body portion 44. Illustrated towing bridle 60 has a pair of flexible line members 62, 64 which connect to the body portion 44 of barrier guide member 40 through padeyes 65 at connection points 66, 68. The connection points 66, 68 are spaced apart from each other and in the illustrated embodiment lie in a substantially horizontal plane.

The illustrated fluid connecting line 20 connects directly to the pig member through a releasable line receiving connection 72. Connection 72 is spring loaded as described below to release the fluid conduit 20 when fluid pressure is terminated at the pig member.

Referring now in more detail to the interconnection and interrelation of the tow line and the fluid conduit 20 to the barrier guide member and the pig member, as noted above, the tow line connects to the line receiving member 56 at the tow eye 58. Tow eye 58 is rotatably connected, in the swivel connection, to the remainder of the line receiving member through a bearing assembly 73 so that the tow eye may freely rotate about a rotational axis 74 (FIG. 5). The bearing assembly between tow eye 58 and a rigid support member 76 has spherical bearing members 78 sandwiched between bearing pads 79 to provide the rotation connection between the tow eye 58 and member 76. Support member 76 has a rigid U-shaped member 80 to which the flexible line members 62,64 are secured.

Referring to FIG. 2, the barrier body portion 44 is rotatably mounted on and supported by a planar plate member 86 through a swivel connection at hollow cylindrical member 88. Hollow rods 38 rigidly support plate member 86 and plate member 86 in turn rigidly supports cylindrical member 88. The barrier body portion 44 has a substantially triangular shaped swivel plate member 90 (see also FIG. 3) which, in the illustrated embodiment, is secured by welding to a shouldered annular ring member 92. Member 92 abuts one side of annular bearing assembly 94 and an annular ring member 96 abuts the other side of the bearing assembly. Bearing assembly 94 is similar to bearing assembly 73. Annular member 96 has internal threads and screws onto hollow cylindrical member 88 to secure the bearing assembly 94 against member 92. As a result, when the towing bridle 60 is urged at in a direction away from the pig member, (to the left in FIG. 2), shouldered annular member 92 seats on annular bearing assembly 94 and freely rotates with plate member 90, as required, about rotation axis 46.

As noted above, the fluid conduit or connecting line 20 connects to the pig member through the releasable connection 72. In the illustrated embodiment, line 20 passes through an interior opening 98 in hollow cylindrical member 88 and is constrained thereby to move solely in an area whereby it does not encircle either of connection points 66, 68. Also, as noted above, weighted member 48 is secured at one end of the triangular shaped member 90. By providing member 48 with sufficient weight to maintain the triangular shaped member 90 and hence body portion 44 in a substantially fixed position relative to the gravitational pull of the earth, a fixed reference position is maintained by the barrier guide member. As a result, the relative spatial orientation between the lines 18 and 20 is a plane normal to the barrier rotation axis 46 is fixed; and in the illustrated embodiment, referring to FIG. 6, the fluid line 20 is always oriented vertically above the tow line 18 because it is above the towing bridle lines 62, 64. Thus the lines 18 and 20 will have a fixed relative orientation at the pig member and at the exit opening 16; and interline twisting is reduced and in most instances eliminated.

In addition to reducing interline twisting, in this preferred embodiment, each line is connected to the respective connecting members with a swivel connection so that the line will not be subject to torsion even though the pig member rotates about its longitudinal axis. This reduces intraline twisting. The swivel connection of the tow line to the line receiving member was described previously. Referring again to FIG. 2, the line member 20 makes a rotatable connection to the pig member through an annular bearing assembly 100. (Bearing assembly 100 is similar to assemblies 73 and 94.) This swivel connection includes an interior line connecting member 102 having a radially outwardly flanged center section 104 and two pipeline connecting end sections 106 and 108 extending longitudinally in opposite directions. Connecting member 102 provides a through flow path from the interior of line 20 to the interior of a pig connecting line 110. Line 20 is secured to the end section 106 by a clamping device 112; and an O ring 114 secured in pipeline section 108 maintains fluid sealing contact with connecting line 110.

Clamping members 120, 122 secure the line 20 connection assembly to the pig member. The clamping members 120, 122 maintain the clamping position, as shown in FIG. 2, in response to the application of fluid pressure, from line 20 via lines (not shown) to the clamping devices. In this clamping position, the clamping devices abut one side of bearing assembly 100 for securing the interior connecting member 102 at its outwardly flanged portion 104 against tension forces exerted on line 20; and at the same time allow the interior connecting member to freely rotate relative to the clamping devices 120, 122, and hence to the remainder of the pig member.

Thus the barrier member and the particular connection of the line members to the pig apparatus provide a relatively fixed spatial orientation of the fluid line 20 to the tow line 18 at the line receiving member 56, by providing a reference orientation independent of pig member rotation, and by constraining the range of movement of the pig member connected line relative to connection points on the rotatable body portion 44. Where more than one line is connected to the pig apparatus, the lines should be connected along the longitudinal axis of the apparatus to maximize reduction of interline twisting. If, however, only one line is connected to the pig apparatus, the line may be connected at substantially any radial location so long as the line is prevented from and cannot encircle any of the connecting points between the line receiving member and the body portion of the barrier guide member. In other words, the illustrated pig member connected line is constrained to pass through a defined area, of a plane containing the connection points, where the plane is substantially normal to the longitudinal axis of the member and the connection points lie on the circumferential boundary of the area.

In other embodiments of the invention, more than one line may be connected to each line receiving member and more than one line receiving member may be connected to the barrier guide member. In addition, each line receiving member may be connected directly to the barrier guide portion along for example a single weld or at separate spaced apart connecting points.

Furthermore, other means may be provided for maintaining the barrier guide member in its fixed reference condition. Thus, while it is preferred to use the weighted member 48 of the illustrated embodiment for both convenience, simplicity, and low manufacturing cost, other apparatus, such as an inertial gyroscopic system could be used for example because the weighted member would not perform satisfactorily.

MAJOR ADVANTAGES OF THE INVENTION

The apparatus and method of the invention thereby advantageously provide a unique structure and method for maintaining the relative positions of a plurality of connecting lines in a fixed orientation at the barrier guide member. In this manner, twisting is advantageously eliminated or is at least significantly reduced. As a result, in the disclosed preferred embodiment, pneumatic pressure to the apparatus will not be interrupted nor will there be a problem in releasing the pneumatic connecting line from the apparatus at any desired time such as after reaching the buckle.

The invention is advantageously very simple in structure employing, in the preferred embodiment, simple gravitational concepts to provide effectively an orientation restoring force and enabling a substantially fixed orientation to be maintained by a body member portion attached for rotation along an axis parallel to the longitudinal axis of the pig member.

The invention may be advantageously extended to more than two connecting lines, for example wherein a plurality of line receiving members are connected to a single barrier body portion or are connected, for example, to a plurality of barrier body portions. By preventing interline twisting between pairs of lines according to the method and apparatus of the invention, reliable and trouble-free operation in an area long plagued by unpredictable line twisting problems is attained.

The invention clearly provides a major advance over the earlier apparatus and methods in which all lines were connected directly to the pig apparatus and wherein the lines were subject to interline twisting as the pig rotated around its longitudinal axis. Thus, for example, while the Jones (U.S. Pat. No. 3,739,591 cited above) pig member operates successfully there is always a potential problem if the lines do not release properly or if they twist and prematurely cut off the supply of pneumatic operating pressure to the pig member. The claimed invention advantageously eliminates the occurrence of these potentially expensive and time consuming problems.

Other embodiments of the invention, including additions, subtractions, deletions, and other modifications of the preferred disclosed embodiment of the invention will be obvious to those skilled in the art and are within the scope of the following claims.

What is claimed is:

1. An apparatus for reducing interline twisting of any pair of a plurality of lines connected between a device for traversing the interior of an elongated tubular member and a tubular member exit opening, as the device traverses an interior section of the tubular member, said device tending to rotate about its longitudinal axis as it traverses said tubular member interior section,
said apparatus comprising
a barrier guide member having
a barrier body portion,
means for mounting said barrier body portion on said device for rotational movement about a barrier member rotation axis, said rotation axis being substantially parallel to said device longitudinal axis, and said body portion having means for maintaining the orientation of said body portion substantially fixed with respect to the direction of gravitational pull of the earth,
at least one line receiving member, each line receiving member being connected to at least one of a first group of said lines, and
first means for connecting each said line receiving member to said body portion at at least one connection point, to provide a relatively fixed spatial orientation for said line receiving member,
second means for connecting each line of a second group of said lines directly to said device without attachment to the barrier guide member, and
said second connecting means interacting with said barrier guide member for preventing each line of said second group from encircling any connection point on the barrier guide member whereby interline twisting is reduced.

2. The apparatus of claim 1 wherein the number of lines of said second group is greater than one,
the total number of said second group of lines is not greater than the number of line receiving members plus one, and
further comprising means for connecting each line of said second group of lines to the device substantially along the longitudinal axis of the device,
whereby each pair of said second group of lines is prevented from interline twisting by said barrier guide member.

3. The apparatus of claim 1 wherein the number of line receiving members is one and the number of said second group lines is one.

4. The apparatus of claim 3 further including
means for connecting said line receiving member to said body portion at two connection points, each point being spaced from the longitudinal axis of said device, and
means for constraining each said second group line to pass through a defined area in a plane containing said two connecting points, said two points lying on a circumference bounding said area, and
said plane being a plane substantially normal to said longitudinal axis.

5. The apparatus of claim 1 wherein said barrier body portion orientation maintaining means comprises
a weighted member connected to the barrier body portion for providing a substantially radially displaced center of gravity for said barrier guide member,
whereby said weighted member maintains said body portion in a substantially fixed vertical orientation independent of the rotational position of the device about its longitudinal axis.

6. The apparatus of claim 1 wherein each second group line is connected to said device in a swivel connection.

7. The apparatus of claim 6 wherein each line receiving member provides a swivel connection for each of said first group lines.

8. An apparatus for reducing interline twisting between a tow line and a fluid connecting line, said lines extending between the device and a tubular member exit opening, as the device traverses an interior section of the tubular member, the device tending to rotate about its longitudinal axis as it traverses the tubular member interior section, the apparatus comprising a barrier guide member having
  a rotatable barrier body portion,
  means for mounting said body portion on the device for rotational movement about a barrier member rotation axis, the rotation axis being substantially parallel to the device longitudinal axis, and the body portion having a weighted member connected thereto for providing a substantially radially displaced center of gravity for the barrier guide member whereby the spatial orientation of the body portion remains substantially fixed with respect to the direction of the earth's gravitational pull and is independent of the rotational position of the device about its longitudinal axis,
a tow line receiving member connected to the barrier body portion by two flexible lines, said flexible lines extending from the line receiving member to different connection point positions on said body portion, said connection positions being spaced apart from each other, and said line receiving member having means for connecting to a tow line,
a fluid line receiving member for connecting said fluid line directly to said device at a position located and without attachment to said barrier guide member on a side of said barrier body portion opposite to that at which said tow line receiving member is located, and
said barrier body portion interacting with the fluid flow line for preventing said fluid line from encircling either of said connecting points, whereby interline twisting between the tow line and the fluid flow line is reduced.

9. The apparatus of claim 8 wherein said constraining means is an aperture in said barrier body portion through which the fluid connection line passes.

10. A method for reducing interline twisting of any pair of a plurality of lines connected between a tubular member opening and a device for traversing the interior of an elongated tubular member from the tubular member opening, said lines tending to twist during travel of the device through the interior of said tubular member as a result of rotation of the device about its longitudinal axis, comprising the steps of maintaining the orientation of a barrier guide member relative to the directional pull of the earth's gravity,
connecting at least one of said lines to said barrier guide member, and
connecting at least one of said lines directly to said device, without attachment to said barrier guide member
constraining each line connected directly to said device to have a fixed spatial orientation relative to each other device connected line, if any, and to each of said barrier member connected lines at the connections of each said barrier connected line to said barrier guide member whereby interline twisting is reduced.

11. The method of claim 10 wherein there are two lines, a tow line connected to said guide member and a fluid flow line connected to said device.

12. The method of claim 10 further including the step of providing swivel connections for each line at said apparatus for reducing intraline twisting.

* * * * *